United States Patent

[11] 3,573,556

| [72] | Inventor | Stanley E. Zocholl<br>Holland, Pa. |
|---|---|---|
| [21] | Appl. No. | 826,932 |
| [22] | Filed | May 22, 1969 |
| [45] | Patented | Apr. 6, 1971 |
| [73] | Assignee | I.T.E. Imperial Corporation<br>Philadephia, Pa. |

[54] OPERATION INDICATOR CIRCUIT FOR STATIC OVERCURRENT RELAYS
10 Claims, 3 Drawing Figs.

[52] U.S. Cl. ............................................. 317/33, 340/256
[51] Int. Cl. ............................................. H02b 7/00
[50] Field of Search .................................. 340/253, 256; 317/149, 157, 33

[56] References Cited
UNITED STATES PATENTS

| 3,335,333 | 8/1967 | Myers ........................... | 317/149 |
| 3,404,291 | 10/1968 | Green et al. ................. | 317/151 |

*Primary Examiner*—James D. Trammell
*Assistant Examiner*—Harry E. Moose, Jr.
*Attorney*—Ostrolenk, Faber, Gerb & Soffen ABSTRACT: An operation indicator circuit for static overcurrent relays including a normally charged capacitor, discharge of which through a first polarity sensitive indicating circuit provides an indication of an overcurrent condition in electrical equipment and discharge of which through a second polarity sensitive indicating circuit after the overcurrent condition has been corrected provides an indication of the absence of an overcurrent condition.

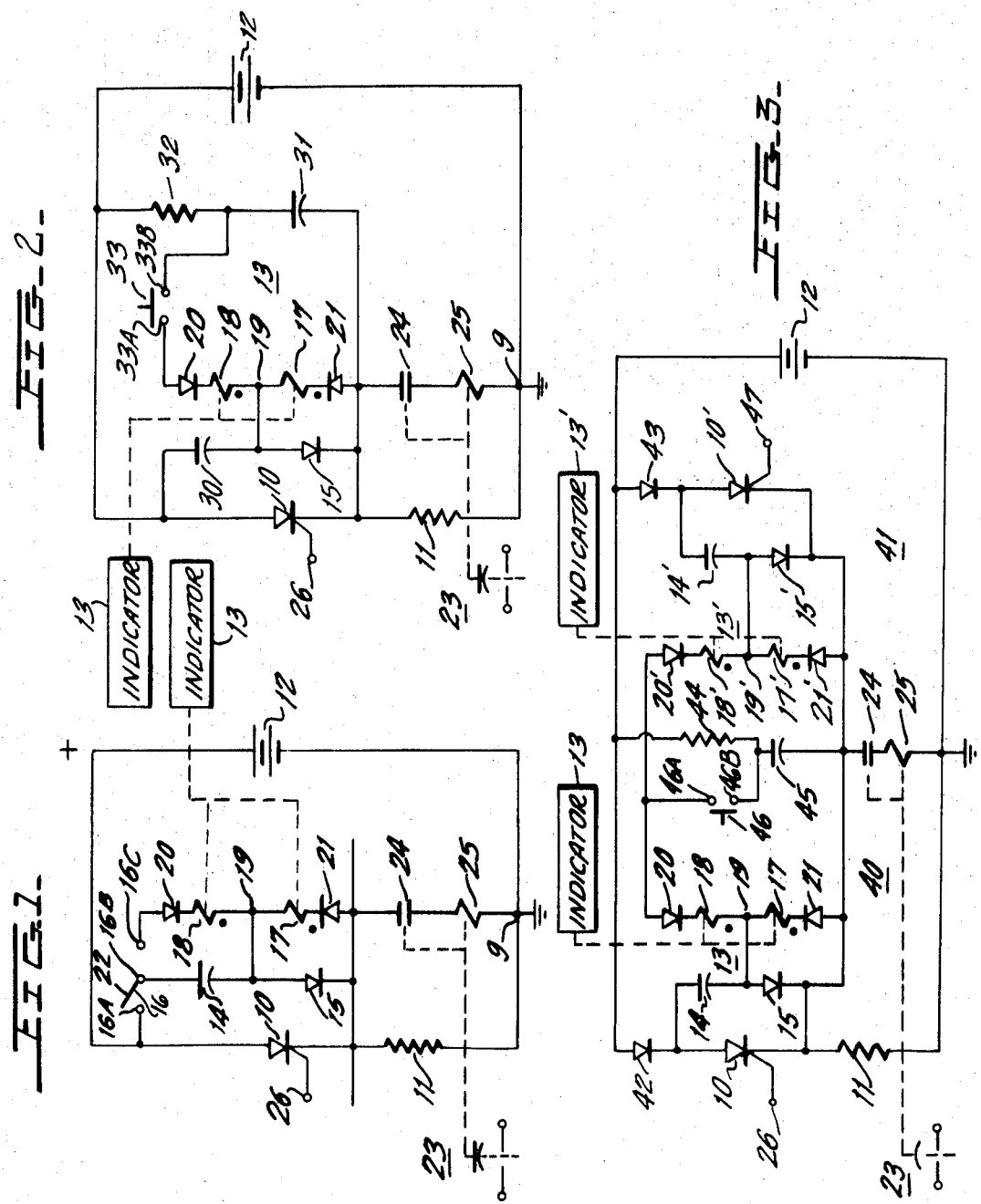

OPERATION INDICATOR CIRCUIT FOR STATIC OVERCURRENT RELAYS

This invention generally relates to static means for indicating overcurrent conditions in electrical circuits in order to initiate automatic protective action. More particularly, the invention relates to a resettable operation indicator which provides a visual indication that an overcurrent condition exists.

The use of electromechanical overcurrent relay means is well known to the prior art. Such electromechanical devices operate as inverse time elements for the protection of electrical transmission networks and the like, wherein slight overload current conditions initiate a tripping operation after a substantially long period of time and wherein extremely large overload current conditions initiate a tripping operation after only a very brief interval of time. Electromechanical overload current sensing means have recently been replaced by static overcurrent relay devices which are comprised of solid-state components such as resistors, capacitors, diodes, transistors, silicon controlled rectifiers, and the like. Such solid-state devices have distinct advantages over electromechanical devices in that:

Maintenance problems are appreciably diminished due to the fact that the solid-state circuits have no moving parts and do not generate an appreciable amount of heat; solid-state circuits have appreciably faster reset times after clearance of a fault condition; overshoot problems are greatly reduced; and solid-state circuits are substantially immune to shock and vibration.

It is an object of the present invention to provide an operation indicator for static overcurrent relays to provide a visual indication of the occurrence of an overload condition.

It is an additional object of the invention to provide such an operation indicator for use in a static overcurrent relay of a type employing a silicon-controlled rectifier which is operative to conduct current only in the presence of an overload condition.

It is a further object of the present invention to provide such an operation indicator in which the visual indication of overload is retained even after the protective action has been taken with the consequent loss of operating power.

It is another object of the present invention to provide such an operation indicator of the type requiring manual resetting so as to further awareness of the existence of an overcurrent condition.

As will become clear hereinafter, an operational indicator embodying the present invention employs a mechanical status indicator having a polarity sensitive set and reset coil. The indicator is set by passing current of a first prescribed polarity through the set coil, and is reset by passing current of a second prescribed polarity through the reset coil.

A charged capacitor and silicon-controlled rectifier are further included in the embodiment of the invention. The silicon-controlled rectifier is normally nonconductive, but is rendered initially conductive upon the occurrence of an overcurrent condition. The firing of the controlled rectifier causes the operation of a trip coil or an equivalent type device of a circuit breaker assembly. To provide a visual indication of this operation, the novel circuit of the invention operates the mechanical status indicator responsive to the firing of the controlled rectifier. Thus, upon the occurrence of such overcurrent, and with the mechanical status indicator in its normal "set" condition, the capacitor discharges through the set coil to provide a first indication that overload has occurred. Following the overcurrent condition, the silicon-controlled rectifier is rendered nonconductive once again, and the capacitor once more becomes charged. To reset the mechanical status indicator, the capacitor is then arranged to discharge through the reset coil.

In a first embodiment of the invention, a single-poled double throw (SPDT) switch is included to establish the capacitor connection for either "set" or "reset" operation. In a second embodiment of the invention, a pair of capacitors are employed one arranged to provide the current through the set coil of the mechanical indicator upon the occurrence of overcurrent, and the other capacitor arranged to provide a current through the reset coil in response to the actuation of a pushbutton-type switch. In a third embodiment of the invention, a pair of silicon-controlled rectifiers and associated circuitry is included for use in an arrangement where the static overcurrent relay provides both an instantaneous tripping action as well as one where time delay is desired.

The above and other objects of the invention will be more fully understood from a consideration of the following description taken in conjunction with the drawings in which:

FIG. 1 shows one embodiment of an operation indicator for static overcurrent relays in accordance with the invention;

FIG. 2 shows a modification of the operation indicator of FIG. 1; and

FIG. 3 shows yet another modification of the operation indicator of FIG. 1.

Referring now to FIG. 1, the operation indicator circuit embodying the invention there shown includes a silicon-controlled rectifier 10, a resistor 11 and a source of direct potential, schematically shown as a battery 12. The anode electrode of the silicon-controlled rectifier (SCR) 10 is coupled to the positive terminal of the source 12, while the negative terminal of the source is coupled to one end of the resistor 11 and to a point of reference or ground potential 9. The cathode electrode of the SCR 10 is further shown as being coupled to the end of the resistor 11 which is remote from ground.

Also included in the operation indicator circuit of FIG. 1 are a mechanical status indicator 13, a capacitor 14, a semiconductor diode 15 and a mechanical switch 16, drawn as being of the single-pole, double throw (SPDT) variety. More particularly, the mechanical status indicator 13 is of the type having series connected set and reset coils 17 and 18, a common terminal 19 and a pair of oppositely poled semiconductor diodes 20 and 21. As shown in the drawing, the anode electrode of the semiconductor diode 20 is coupled to one terminal 16C of the mechanical switch 16 while the corresponding electrode of the semiconductor diode 21 is coupled to the junction of the SCR 10 with the resistor 11. The junction 19 of the mechanical status indicator 13 is coupled to the junction of the anode electrode of the semiconductor diode 15 with one plate of the capacitor 14. The cathode electrode of the diode 15 is in turn coupled to the anode electrode of the diode 21, while the remaining plate of the capacitor 14 is coupled to the terminal 16B of the mechanical switch 16.

Terminal 16A of the switch 16 is further coupled to the junction of the positive terminal of the source 12 and the anode electrode of the SCR 10. As indicated in the drawing, the movable arm 22 of the mechanical switch 16 is coupled to the terminal 16B and is effective to switch between terminals 16A and 16C. The cathode electrodes of the diodes 20 and 21 are also coupled to the ends of the reset and set coils 18 and 17, respectively, which are remote from the common terminal 19.

The operation indicator circuit of FIG. 1 is intended to be connected to a circuit breaker assembly 23 of the type having an auxiliary contact 24 serially coupled with the trip coil 25 of that assembly. As indicated by the dotted lines, the units 24 and 25 are connected together and to the movable contact arm of the breaker 23. More specifically, the contact 24 is of the type to be in its open or nonconductive condition when the circuit breaker 23 is open and to be in its closed or conductive condition when the breaker 23 is closed. In addition, the trip coil 25 is of the type to open the circuit breaker 23 in response to current flow therethrough. As shown, the series connection 24, 25 is connected across the resistor 11.

In the operation of the indicator of FIG. 1, it will be assumed that the gate electrode of the SCR 10 is coupled to an input terminal 26, where a control indication of an overcurrent condition in the electrical power equipment associated with the circuit breaker 23 will be developed. It will also be assumed that the mechanical switch 16 has its contact arm 22 connecting the terminal 16A. Under normal operating conditions, no electrical control signal is developed at terminal 26 and the SCR 10 is nonconductive.

Under such conditions, i.e. prior to the activation of SCR 10, capacitor 14 will charge up to the voltage of the potential source 12 through diode 15 and resistor 11. Upon the occurrence of an overcurrent in the associated electrical equipment, a signal indication to that effect (positive going) is supplied at terminal 26 and is coupled to the gate electrode of SCR 10. This causes SCR 10 to become conductive, to permit current flow from source 12, through the SCR 10, the contact 24 (which is closed when breaker 23 is closed) and the trip coil 25. As a result of the current through trip coil 25, the circuit breaker 23 is opened.

At the same time, the charge stored on capacitor 14 discharges through SCR 10, diode 21 and set coil 17. If the set and reset coils 17 and 18 are incorporated in a dot type of mechanical status indicator 13, a pivoted disc included therein may be made to rotate to show its colored or dark side in response to the current flow through coil 17. Such an indicator is described in Publication No. 922 of the Electronics Division of FERRANTI-PACKARD ELECTRIC LIMITED of Toronto, Ontario, Canada.

Once the trip coil 25 opens the circuit breaker 23 the auxiliary contact 24 connected thereto opens as well, to break the current path from the source 12 through the SCR 10 to ground. Capacitor 14, in this instance, then recharges to the potential of the source 12 by means of the diode 15 and the resistor 11. In this respect, it will be understood that the resistor 11 is selected of a value to limit the charge current below the value of the SCR holding current.

The mechanical status indicator 13—of the Ferranti-Packard manufacture, for example, is of a type to retain its visual indication even though the current through the set coil 17 is extinguished. Thus, in response to an overcurrent condition, there will be a ceasing of current flow through the SCR 10 and through the set coil 17. At the remote location of the operation indicator of FIG. 1, however, the visual indication of the occurring of an overcurrent condition is retained even though all power to the operating electrical equipment is interrupted by the circuit breaker assembly 23.

The operation indicator used in the circuit of FIG. 1 can be reset after the fault leading to the overcurrent condition has been corrected. To reset the operation indicator, the contact arm 22 of the mechanical switch 16 is rotated to contact terminal 16C. The previously charged capacitor 14 now discharges through diode 20 and reset coil 18. With the dot type of mechanical status indicator previously described, such current flow through coil 18 will rotate the pivoted disc included therein to show its light side or, alternatively, a second colored side.

The operation indicator is now once again ready for usage with the circuit breaker assembly. Prior to the mechanical closing of the circuit breaker contact arm, however, the contact 22 of the mechanical switch 16 is once again thrown to contact the terminal 16A.

Referring now to FIG. 2, a modified operation indicator circuit of the present invention is shown with corresponding elements being represented by the same reference notations as in FIG. 1. The indicator circuit of FIG. 2 differs from that of FIG. 1 in that a pair of storage capacitors 30 and 31 are employed, along with a second resistor 32 and a pushbutton-type switch 33. As shown in the drawing, the capacitor 31 and resistor 32 are serially coupled between the positive terminal of the source 12 and the anode electrode of the diode 21; the capacitor 30 is coupled between the common junction 19 and the positive terminal of the source 12; while the pushbutton switch 33 has one of its terminals 33A coupled to the anode electrode of the diode 20 and the other of its terminals 33B coupled to the junction between capacitor 31 and resistor 32.

Under normal (closed) operating conditions of the circuit breaker 23, and with the pushbutton 33 open, capacitors 30 and 31 each charge to the potential of the source 12, capacitor 30 by means of diode 15 and resistor 11, and capacitor 31 by means of resistors 11 and 32. When an overcurrent condition occurs, capacitor 30 discharges through the then conductive SCR 10, diode 21 and set coil 17. This provides a visual indication of overcurrent at the remote location in a manner similar to that described with respect to FIG. 1. When the resulting current through the trip coil 25 opens the circuit breaker assembly 23 and the contact 24, the SCR 10 is rendered nonconductive and capacitor 30 once again charges to the potential of the source 12. Resistor 32, in this respect, will be understood to be of a sufficiently high value to prevent appreciable discharge of capacitor 31 through SCR 10 while SCR 10 is conductive.

The resetting of the operation indicator is performed by depressing the pushbutton switch to discharge capacitor 31 by means of diodes 15 and 20 and through reset coil 18. Pushbutton switch 33 is a momentary pushbutton and is opened when the actuation of it is removed.

Referring now to FIG. 3, there is shown another embodiment of the operation indicator circuit according to the present invention. In FIG. 3 a pair of operation indicators similar to that described in FIG. 2 are included. In particular, the operation indicator 40 of FIG. 3 is intended for use with a static current relay providing a tripping operation after only a very brief interval of time while the indicator 41 is intended for use with a static current relay providing a tripping operation after a substantially long period of time. Both static current relays employ a common circuit breaker assembly, however, and the operation indicators 40, 41 employ the same auxiliary contact 24 and trip coil 25 of the assembly for their operations. Those components in FIG. 3 corresponding to similar components in FIG. 1 carry the same reference numeral, but with a prime (') notation.

The operation indicator circuits of FIG. 3 additionally include a pair of semiconductor diodes 42 and 43, a resistor 44, a capacitor 45 and a pushbutton switch 46. In addition, a further input terminal 47 is shown being connected to the gate electrode of the SCR 10' in indicator 41. As shown, the anode electrodes of diodes 42 and 43 are each coupled to the positive terminal of the source 12, with the cathode electrodes of those diodes being coupled to the corresponding anode electrode of the SCRs 10 and 10' in the two indicators 40 and 41. Also, resistor 44 and capacitor 45 are serially connected between the positive terminal of source 12 and the anode electrode of the diodes 21 and 21' of the two operation indicators. Additionally, one terminal 46A of the mechanical switch 46 is coupled to the anode electrode of the diode 20, while the other contact 46B is connected to the junction between resistor 44 and capacitor 45.

The operation of the indicators 40 and 41 of FIG. 3 is basically the same as that of either FIG. 1 or FIG. 2. However, it will be understood that one of the two indicators 40 and 41 (for example indicator 40) is intended for usage with a static current relay operative at an earlier point of time than the relay operative with the indicator 41. This occurs for example where the indicator 40 provides an indication of circuit breaker operation due to instantaneous tripping due to a high overload current whereas that of the indicator 41 and circuit breaker assembly is to provide indication of circuit breaker operation due to time delayed tripping on a relatively low overload current. Thus, the circuit breaker is provided with both instantaneous and time delay trip means of any conventional type (not shown) which, upon their operation, apply signals to terminals 26 and 47 respectively of SCR's 10 and 10', respectively. Obviously, other types of trip units such as undervoltage trip circuits and the like could also be used as the source of input signal to the indicator circuit.

When the circuit breaker 23 is closed and with the pushbutton switch 46 in its unconnected condition, capacitors 14 and 14' and capacitor 45 will be charged to the potential of the source 12, capacitor 14 of indicator 40 by means of diodes 15 and 42 and resistor 11, capacitor 14' of indicator 41 by means of diodes 15 and 43 and resistor 11, and capacitor 45 by means of resistors 11 and 44. Upon the occurrence of an overcurrent condition in the static current relay associated with indicator 40, an electrical signal indication is provided the gate electrode of SCR 10. As a result, the previously nonconductive SCR 10 is rendered conductive, and capacitor 14 discharges through SCR 10, diode 21 and set coil 17. With the mechanical status indicator 13 again being of the dot type variety, the disc included therein is rotated to provide at the remote location a visual indication of the overcurrent condition. The current flowing from battery 12 through diode 42, SCR 10, contact 24 and trip coil 25, as before, serves to open the circuit breaker assembly 23, and cut off all power to its associated electrical equipment.

To reset the dot indicator after the fault has been located, the pushbutton switch 46 is depressed to discharge capacitor 45 by means of diodes 15 and 20 and reset coil 18. When pushbutton switch 46 is disconnected, capacitor 45 once again charges to the potential of the source 12. It will be noted in this respect that capacitor 45 also discharges through the diodes 15' and 20', and through the reset coil 18' of the indicator 41; but, since the dot indicator was there never placed in its "set" condition, as the normally nonconductive SCR 10' was never rendered conductive, the current flow through the reset coil 18 produces no change in the indicator 13'.

Upon the occurrence of the overcurrent condition in the static current relay associated with the indicator 41, an electrical indication of that overload is provided at the terminal 47. In response thereto, the SCR 10' is rendered conductive permitting the charged capacitor 14' to discharge by means of the SCR 10', the diode 21' and the set coil 17'. Once again, if the set coil be of the dot type variety it will be rotated in response to the current flow through the set coil 17' to provide a visual indication of the overload. To reset, the pushbutton switch 46 is once again depressed, enabling the capacitor 45 to discharge through diodes 15' and 20' and reset coil 18'.

It will be noted that both in the operation of the indicator 40 of FIG. 3 and in the operation of the indicator 41, energization of either of the terminals 26 and 47 permits current flow through the contact 24 and the trip coil 25. As a result, the circuit breaker arm in the assembly 23 will be opened to protect the electrical equipment operating in conjunction therewith. Upon such happening, the SCRs 10 or 10' are turned off. Therefore, as in the arrangement of FIGS. 1 and 2, after the opening of the circuit breaker assembly, the capacitors 14 and 14' once again charge to the value of the potential source 12.

It will also be noted with respect to the operation of the indicators 40 and 41 that the polarity of the respective diodes 42 and 43 prevent any interaction between the two indicators. Thus, the inclusion of the diode 42 prevents the discharge current of the capacitor 14 of indicator 40 from coupling over to the indicator circuit 41 in a direction to render the SCR 10' conductive. Similarly, diode 43 prevents the discharge current of capacitor 14' from rendering SCR 10 in indicator 40 conductive.

Thus, it will be seen from each of the foregoing descriptions that a visual indication of relay circuit operation is provided. For example, if one color is showing on the disc of a dot-type mechanical indicator, then a circuit abnormality is known to exist. If no color or a different color is showing, that provides an indication that the circuit is operating normally. In this respect, it will be understood that no visible indication is readily provided by the condition of the auxiliary contact at the circuit breaker location.

Furthermore, it will be noted that in the presence of an overcurrent condition, the operation indicator will indicate such a condition even though all power be cut off to the electrical equipment in which the fault occurs. Also, it will be apparent that a manual reset is required for the operation indicator, thereby providing a recurring warning of circuit malfunction until the correction is carried out.

While the present invention has been described in an environment in which the mechanical indicator is of the dot-type variety providing different color indications corresponding to normal and abnormal circuit functions, it will be apparent that other types of indicators may additionally be employed. For example warning lights, bell systems and flag arrangements can be employed, each of which can be coded to indicate the difference between a normal and a fault circuit condition. In such configurations, these lights, bell systems etc., can be substituted for the set and reset coils of the drawings when arranged to preserve their visual indications after the cutoff of electrical power to the malfunctioning equipment.

The novel circuits described above exhibit all the features employed in prior electromechanical relays, but without the disadvantage of adding, as in those arrangements, any impedance to the trip circuit or auxiliary relay there employed.

I claim:

1. An operation indicator circuit for static overcurrent relays of the type including a silicon-controlled rectifier serially connected with a contact and associated trip coil of a circuit breaker assembly across a source of unidirectional potential, with the silicon-controlled rectifier being in a nonconductive condition under normal operation of electrical equipment protected by said circuit breaker assembly, and with the silicon-controlled rectifier being rendered conductive upon a predetermined condition in said equipment to cause a first current flow from said potential source through said controlled rectifier to operate said trip coil to open said circuit breaker assembly, said operation indicator circuit comprising:

a capacitor;

first indicator means responsive to a second current flow therein for providing an indication of a predetermined condition in said electrical equipment;

a charge circuit coupled to said capacitor for enabling said capacitor to charge towards the voltage value of said unidirectional potential source; and means including said silicon-controlled rectifier coupled to said capacitor and to said indicator means for discharging the voltage stored on said capacitor by said charge circuit upon the occurrence of said predetermined condition to provide a closed circuit path including said capacitor, said then conductive controlled rectifier and said first indicator means to produce said second current flow through said indicator means to provide said predetermined condition indication.

2. An operation indicator circuit as defined in claim 1 wherein said indicator means provides said predetermined condition indication even after said circuit breaker assembly disconnects all power to said electrical equipment in response to current flow through said trip coil.

3. An operation indicator circuit as defined in claim 1 wherein there is also included second indicator means responsive to current flow therein for providing an indication of a second predetermined condition in said electrical equipment and wherein there is further included means, exclusive of said silicon-controlled rectifier, coupled to said capacitor for discharging the voltage stored on said capacitor after correction of said first predetermined condition in said electrical equipment to permit current flow through said second indicator means to provide said second predetermined condition indication.

4. An operation indicator circuit as defined in claim 1 wherein there is also included second indicator means responsive to current flow therein for providing an indication of a second predetermined condition in said electrical equipment and wherein there is further included a second capacitor, a charge circuit coupled to said second capacitor for enabling said second capacitor to charge towards the voltage value of said unidirectional potential source and means, exclusive of said silicon-controlled rectifier, coupled to said second capacitor for discharging the voltage stored on said second capacitor after correction of said first predetermined condition in said electrical equipment to permit current flow through said second indicator means to provide said second predetermined condition indication.

5. An operation indicator circuit as defined in claim 3 wherein there is further included mechanical switch means coupling said capacitor to said silicon-controlled rectifier to enable providing of said first predetermined condition indication and for coupling said capacitor to said last-mentioned means to enable providing of said second predetermined condition indication.

6. An operation indicator circuit as defined in claim 3 wherein said first predetermined condition is an overcurrent condition in said electrical equipment and wherein said second predetermined condition is a nonovercurrent condition therein.

7. An operation indicator circuit for static overcurrent relays comprising:
   first and second terminals;
   a first series connection between said first and second terminals including a capacitor, a semiconductor diode and a resistor;
   a second series connection between said first and second terminals including a silicon-controlled rectifier having anode and cathode electrodes, an operating contact of a circuit breaker assembly and a trip coil of said assembly, with the anode electrode of said controlled rectifier coupled to said first terminal;
   means coupling the end of said resistor remote from said second terminals to the cathode electrode of said silicon-controlled rectifier;
   indicator means responsive to current flow therethrough for providing an indication of an overcurrent condition in electrical equipment protected by said circuit breaker assembly; said indicator means being connected across said semiconductor diode;
   a source of unidirectional potential coupled between said first and second terminals;
   means coupled to control electrode of said silicon-controlled rectifier and responsive to the operating current condition of said electrical equipment for rendering said silicon-controlled rectifier nonconductive under normal operating conditions of said equipment and for rendering said silicon-controlled rectifier conductive upon the occurrence of an overcurrent condition in said equipment; and
   whereby said capacitor charges to the voltage value of said unidirectional potential source through said semiconductor diode and said resistor under normal operations of said electrical equipment and discharges through said silicon-controlled rectifier and said indicator means upon the occurrence of said overcurrent condition to provide an indication thereof.

8. An operation indicator circuit as defined in claim 7 wherein there is further included second indicator means responsive to current flow therethrough for providing an indication of a nonovercurrent condition in said electrical equipment, and means for discharging said capacitor through said second indicator means after correction of said overcurrent condition in said electrical equipment to permit current flow through said second indicator means to provide said nonovercurrent indication condition.

9. An operation indicator circuit as defined in claim 8 wherein said first indicator means includes a polarity sensitive set coil for providing a visual indication of an overcurrent condition in response to current flow therethrough.

10. An operation indicator circuit as defined in claim 9 wherein said second indicator means includes a polarity sensitive reset coil responsive to current flow therethrough for providing a visual indication of a nonovercurrent condition being present.